(12) United States Patent
Jeansonne et al.

(10) Patent No.: US 7,944,642 B2
(45) Date of Patent: *May 17, 2011

(54) HARD DISK DRIVE PROTECTION SYSTEM AND METHOD

(75) Inventors: Jeffrey Kevin Jeansonne, Houston, TX (US); Leonard E. Russo, Houston, TX (US); L. Joy Griebenow, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/319,327

(22) Filed: Jan. 6, 2009

(65) Prior Publication Data

US 2009/0116139 A1 May 7, 2009

Related U.S. Application Data

(63) Continuation of application No. 12/012,709, filed on Feb. 5, 2008, now Pat. No. 7,492,544, which is a continuation of application No. 11/413,571, filed on Apr. 28, 2006, now Pat. No. 7,355,807.

(51) Int. Cl.
*G11B 21/02* (2006.01)

(52) U.S. Cl. .......................................... 360/75

(58) Field of Classification Search ........................ None
See application file for complete search history.

(56) References Cited

U.S. PATENT DOCUMENTS

| | | |
|---|---|---|
| RE35,269 E | 6/1996 | Comerford |
| 5,835,298 A | 11/1998 | Edgerton et al. |
| 5,982,573 A | 11/1999 | Henze |
| 6,101,062 A | 8/2000 | Jen et al. |
| 6,441,987 B1 | 8/2002 | Lee |
| 6,520,013 B1 | 2/2003 | Wehrenberg |
| 6,549,372 B1 | 4/2003 | Chen et al. |
| 6,566,832 B2 | 5/2003 | Ataee |
| 6,570,726 B2 | 5/2003 | Mutoh |
| 6,603,620 B1 | 8/2003 | Berding |
| 6,693,762 B2 | 2/2004 | Zhu et al. |
| 6,768,066 B2 | 7/2004 | Wehrenberg |
| 6,771,449 B1 | 8/2004 | Ito et al. |
| 6,917,491 B2 | 7/2005 | Choi |
| 6,950,282 B2 | 9/2005 | Yim et al. |
| 6,995,939 B2 | 2/2006 | Ito et al. |
| 7,106,541 B2 | 9/2006 | Bruner et al. |
| 7,142,385 B2 * | 11/2006 | Shimotono et al. ............. 360/60 |
| 7,355,807 B2 | 4/2008 | Jeansonne et al. |

\* cited by examiner

*Primary Examiner* — K. Wong

(57) ABSTRACT

A hard disk drive protection system comprises a sensor configured to detect an impending shock event and a hard drive protection module configured to determine whether to issue a fast park command for a hard disk drive in response to detecting the impending shock event based on a permissible quantity of fast park cycles for the hard disk drive.

19 Claims, 1 Drawing Sheet

HARD DISK DRIVE PROTECTION SYSTEM AND METHOD

CROSS-REFERENCE TO RELATED APPLICATIONS

This is a continuation of U.S. patent application Ser. No. 12/012,709 entitled "HARD DISK DRIVE PROTECTION SYSTEM AND METHOD," filed Feb. 5, 2008 now U.S. Pat. No. 7,492,544, by JEANSONNE, et al., and assigned to the present assignee, which is a continuation of U.S. patent application Ser. No. 11/413,571 entitled "HARD DISK DRIVE PROTECTION SYSTEM AND METHOD," filed Apr. 28, 2006, now U.S. Pat. No. 7,355,807, issued on Apr. 8, 2008, and assigned to the present assignee, and is hereby incorporated by reference herein.

BACKGROUND OF THE INVENTION

The effectiveness of protecting hard disk drives in shock events, especially those following events such as a free fall event (e.g., dropping a device containing a hard disk drive), is dependent on the length of time between detecting the event and parking of the head(s). Accordingly, if the time between prediction of an impending shock event and parking of the disk drive head(s) can be reduced, especially in free fall events, the likelihood of damage to the disk drive may be substantially reduced and/or eliminated. However, the faster the head(s) of the disk drive is parked, the greater risk of damage to the head(s) and other internal components of the disk drive.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
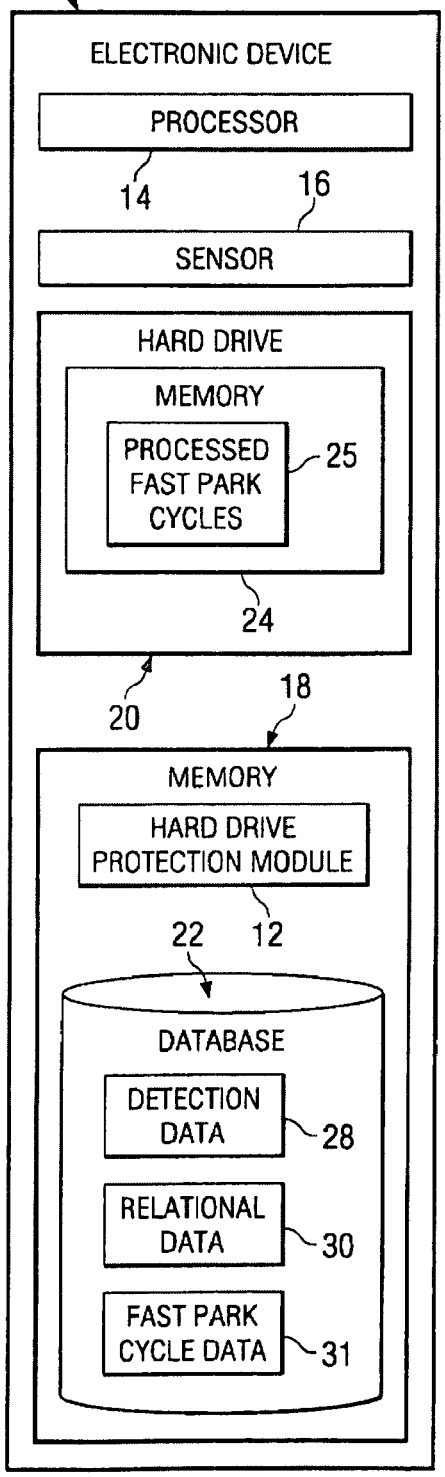
FIG. 1 is a block diagram illustrating an embodiment of an electronic device in which an embodiment of a hard disk drive protection system is employed to advantage.
Figure 2:
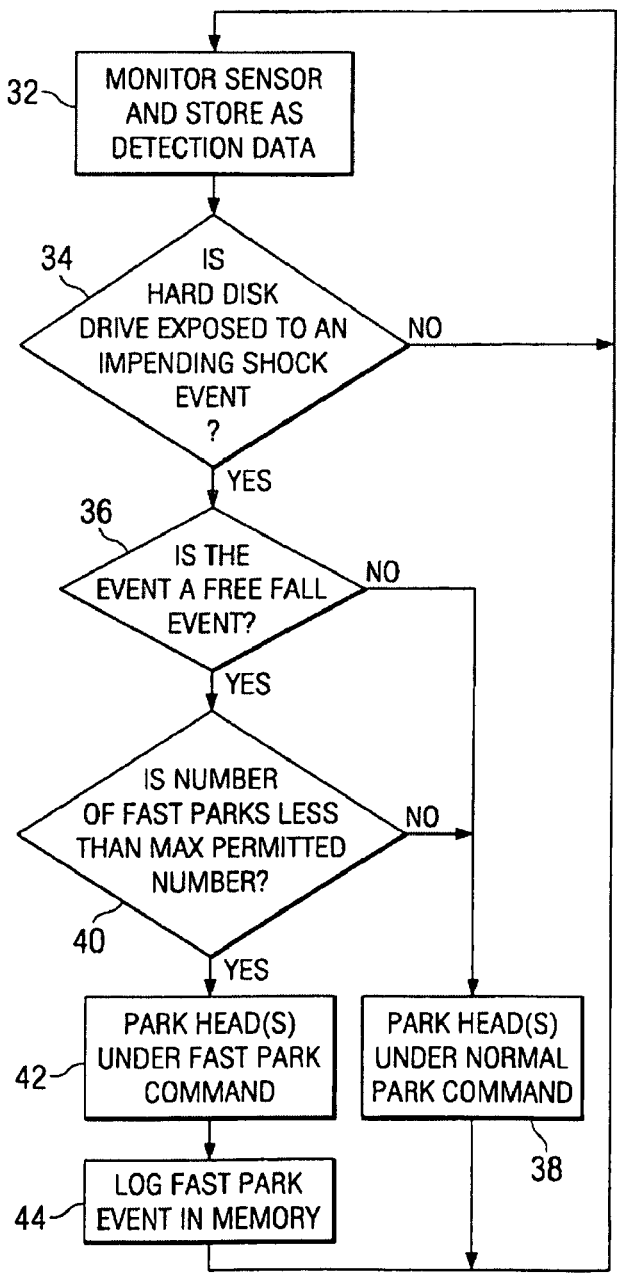
FIG. 2 is a flow diagram illustrating an embodiment of a hard disk protection method for an electronic device in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of an electronic device 8 in which an embodiment of a hard disk drive protection system 10 is employed to advantage. In the embodiment illustrated in FIG. 1, electronic device 8 may comprise any type of electronic device having a hard disk drive 20 such as, but not limited to, portable computer devices, personal digital assistants, music players, gaming devices, etc.

In the embodiment illustrated in FIG. 1, hard disk drive protection system 10 comprises a processor 14, a sensor 16, a memory 18 and hard disk drive 20. In the embodiment illustrated in FIG. 1, sensor 16 may be any type of sensor that detects the forces acting on electronic device 8 (and hard disk drive 20). For example, sensor 16 may comprise a three-axis digital accelerometer or other type of sensing element for detecting relative movement of electronic device 8. In the embodiment illustrated in FIG. 1, memory 18 comprises a hard drive protection module 12 and a database 22. Hard drive protection module 12 may comprise hardware, software, firmware or a combination thereof. In FIG. 1, hard drive protection module 12 is illustrated as being stored in memory 18 so as to be accessible and/or executable by processor 14. However, it should be understood that hard drive protection module 12 may be otherwise stored.

In operation, sensor 16 is communicatively coupled to processor 14 and/or hard drive protection module 12. In response to detecting an impending a shock event via sensor 16 (e.g., detecting dropping of electronic device 8 and/or otherwise predicting an impending collision), hard drive protection module 12 sends a command to processor 14 and/or hard disk drive 20 to park the head(s) of hard disk drive 20 on an adjacent support member so as to be securely positioned apart from a rotating media of hard disk dive 20. Hard drive protection module 12 is configured to send a signal to processor 14 and/or hard disk drive 20 to park the head(s) using a fast park command (e.g., removing the head from the rotating media with a maximum and/or high level of force and placing the head on the adjacent support with minimal deceleration of the head assembly before it contacts the support) upon predicting an impending high impact shock event, such as for example, a free fall event. However, the life of a hard disk drive is substantially reduced when using fast park commands due to the impact forces resulting from minimal deceleration of the head. For example, a fast park cycle results in substantially increased wear of a hard disk drive compared to the amount of wear experienced from a normal park cycle.

Embodiments of the present invention monitor the frequency and/or quantity of processed fast park cycles for hard disk drive 20 and determine whether to issue a fast park command based on the frequency/quantity of previously processed cycles and/or the particular shock event. Thus, in some embodiments of the present invention, if the total number of processed fast park cycles (e.g., removing the head from the rotating media and frictionally engaging the support) exceeds a maximum number of permissible fast park cycles for a particular hard disk drive 20, hard drive protection module 12 sends a signal to processor 14 and/or hard disk drive 20 to park the head(s) in a normal park mode (e.g., removing the head from the rotating media using controlled acceleration and placing the head on the adjacent support with a controlled deceleration of the head before it contacts the support).

In other embodiments of the present invention, if the total number of processed fast park cycles reaches a maximum number of permissible fast park cycles for a particular hard disk drive 20, a fast park command may continue to be issued and processed while a warning or other notification that the quantity of fast park cycles for the particular hard disk drive 20 has been exceeded is indicated to the user (e.g., notifying the user via a display device or otherwise that successive fast park cycles may cause failure or damage to the hard disk drive 20 and recommending service or replacement of hard disk drive 20). In the embodiment illustrated in FIG. 1, hard disk drive 20 comprises a non-volatile memory 24 for storing the number of fast park cycles processed by hard disk drive 20 (e.g., stored as processed fast park cycles 25). Thus, in this example, even though the permissible quantity of fast park cycles for the particular hard disk drive 20 has been reached, successive fast park cycles are processed and the successive fast park cycles logged (e.g., in memory 24).

Embodiments of the present invention also indicate to a user the quantity of processed fast park cycles relative to a permissible quantity of fast park cycles for the particular hard disk drive 20. For example, in some embodiments of the present invention, hard drive protection module 12 is configured to issue an alert and/or otherwise notify a user that the permissible quantity of fast park cycles for the particular hard disk drive 20 is being approached or has been met and that service or replacement of hard disk drive 20 is recommended.

In the embodiment illustrated in FIG. 1, database 22 comprises detection data 28, relational data 30 and fast park cycle data 31. Detection data 28 comprises information associated with forces acting on electronic device 8 (and thus hard drive 20) that are detected by sensor 16. Relational data 30 comprises known and/or predetermined value ranges corresponding to typical force values detected by sensor 16 for particular shock prediction events (e.g., a free fall condition when electronic device 8 is dropped). Fast park cycle data 31 comprises information associated with a quantity of permissible fast park cycles for a particular hard disk drive and/or a quantity of processed fast park cycles for a particular hard disk drive. For example, fast park cycle data 31 may comprise information associated with a quantity of permissible fast park cycles for a plurality of different types, models, manufactured, etc., of hard disk drives such that, for the particular hard disk drive installed in electronic device 8, the permissible quantity of fast park cycles for the particular hard disk drive can be determined (e.g., especially since hard disk drives can be replaced). Further, fast park cycle data 31 comprises information associated with a quantity of fast park cycles performed for a particular hard disk drive installed in electronic device 8 to determine whether another fast park command may be issued for the particular hard disk drive. While hard drive protection module 12 and database 22, including detection data 28, relational data 30 and fast park cycle data 31, are illustrated as being stored separate from sensor 16 (e.g., in memory 18), it should be understood that sensor 16 may be configured to store hard drive protection module 12 and database 22 directly thereon to facilitate the issuance of a fast park command.

In operation, detection data 28 is compared to relational data 30 by hard drive protection module 12 to determine whether a shock event is predicted to occur. If detection data 28 falls within a predetermined value range indicated by relational data 30 for predicting a particular type of shock event, disk protection module 12 transmits and/or otherwise generates a software interrupt or other signal to park the head of hard drive 20. In each instance that a fast park occurs, hard drive protection module 12 transmits a log event to memory 24 of hard disk drive 20 to record in memory 24 that a fast park cycle has been processed by hard disk drive 20. For example, in response to electronic device 8 being dropped (e.g., a free fall), detection data 28 generated by sensor 16 is compared to relational data 30 by hard drive protection module 12 to detect the free fall condition. In response to determining the free fall condition, hard drive protection module 12 transmits a signal to cause a fast park command to be issued to park the head(s) of hard disk drive 20. The fast park cycle is also logged in memory 24 of hard disk drive 20.

Embodiments of the present invention monitor the frequency and/or quantity of processed fast park cycles for hard disk drive 20 and determine whether to issue a fast park command based on the frequency/quantity of previously processed fast park cycles. For example, in operation, hard drive protection module 12 accesses fast park cycle data 31 to determine a quantity of permissible fast park cycles for the particular hard disk drive 20 in electronic device 8. Additionally, hard drive protection module 12 accesses and/or otherwise determines the quantity of previously processed fast park cycles for the particular hard disk drive 20 in device 8 (e.g., based on processed fast park cycles 25 in memory 24).

If the quantity of processed fast park cycles 25 is less than the predetermined permissible amount of fast park cycles for hard disk drive 20 based on fast park cycle data 31, hard drive protection module 12 issues and/or otherwise causes to issue a signal to fast park the head(s) of hard disk drive 20 in response to detecting an impending shock event. However, if the quantity of processed fast park cycles 25 is equal to the predetermined permissible amount of fast park cycles for hard disk derive 20 based on fast park cycle data 31, hard drive protection module 12 instead issues and/or otherwise causes a signal to park the head(s) of hard disk drive 20 via a normal park mode in response to an impending shock event shock event. Alternatively, hard drive protection module 12 may be configured to process a fast park cycle even if exceeding the permissible amount of fast park cycles for hard disk drive 20 while notifying a user that the permissible amount of fast park cycles for hard disk drive 20 has been met and/or exceeded.

FIG. 2 is a flow diagram illustrating an embodiment of a hard drive protection method in accordance with the present invention. The method begins at block 32, where the output from sensor 16 is stored as detection data 28. At decisional block 34, detection data 28 is compared to relational data 30 to determine an impending shock event. If a shock event is not predicted, output of sensor 16 is further monitored at block 32. If an impending shock event has been detected, the method proceeds to decisional block 36, where a determination is made whether the shock event is one requiring a fast park command (e.g., a free fall event). For example, detection data 28 is compared to relational data 30 to detect the type of impending shock event and the type of park command, if necessary, that should be issued. If it is determined that the impending shock event does not necessitate a fast park of hard disk drive 20 but that the head(s) of hard disk drive 20 should be parked, the method proceeds to block 38, where a command is issued to park the head(s) of hard disk drive 20 using a normal park cycle. If at decisional block 36 it is determined that the impending shock event necessitates a fast park command (e.g., a free fall condition), the method proceeds to decisional block 40 where it is determined whether the number of previously processed fast park cycles 25 for hard disk drive 20 is less than a maximum number of permissible fast park cycles as indicated by fast park cycle data 31. If the number of previously processed fast park cycles 25 for hard disk drive 20 is less than a maximum number of permissible fast park cycles for hard disk drive 20 as indicated by fast park cycle data 31, the method proceeds to block 42 where a fast park command is issued to park the head(s) of hard drive 20. At block 44, hard drive protection module 12 causes the fast park cycle to be logged in memory 24 of hard disk drive 20 (e.g., incrementing a value of processed fast park cycles 25). If the number of previously processed fast park cycles 25 for hard disk drive 20 is equal to a maximum number of permissible fast park cycles for hard disk drive 20 as indicated by fast park cycle data 31, the method proceeds to block 38 where a command is issued to 42 where a command is issued to park the head(s) of disk drive 20 using a normal park mode.

Therefore, embodiments of the present invention automatically determine whether to park a head(s) of a hard disk drive using a fast park or normal park mode based on the type of impending shock event detected and based on the quantity of permissible fast park cycles for a particular hard disk drive. Embodiments of the present invention provide a low latency mechanism to configure the drive in a safe state (e.g., a state that less susceptible to damage during shock events such as free falls). Additionally, embodiments of the present invention prolong the life of hard disk drive 20 by reducing and/or limiting the number of fast park commands issued to park the head(s) of hard disk drive 20.

What is claimed is:

1. A hard disk drive protection system, comprising:
   a sensor configured to detect an impending shock event; and
   a hard drive protection module configured to determine whether to issue a fast park command for a hard disk drive in response to detecting the impending shock event based in part on a quantity of fast park cycles processed by the hard disk drive.

2. The system of claim 1, wherein the hard drive protection module is configured to access fast park cycle data to determine the quantity of fast park cycles processed for the hard disk drive.

3. The system of claim 1, wherein the hard drive protection module is configured to issue a normal park command for the hard disk drive if the quantity of fast park cycles processed by the hard disk drive has reached a predetermined threshold.

4. The system of claim 1, wherein the impending shock event is a free fall event.

5. The system of claim 1, wherein the quantity of fast park cycles processed by the hard disk drive is stored in a memory of the hard disk drive.

6. The system of claim 1, wherein the hard drive protection module is configured to issue an alert indicating that the quantity of fast park cycles processed by the hard disk drive is approaching a predetermined threshold.

7. The system of claim 1, wherein the hard drive protection module is configured to issue an alert indicating that quantity of fast park cycles processed by the hard disk drive has reached a predetermined threshold.

8. The system of claim 1, wherein the hard drive protection module is configured to issue an alert indicating that the quantity of fast park cycles processed by the hard disk drive has exceeded a predetermined threshold.

9. A hard disk drive protection method, comprising:
   detecting an impending shock event; and
   determining whether to issue a fast park command for a hard disk drive in response to detecting the impending shock event based in part on a quantity of fast park cycles processed by the hard disk drive.

10. The method of claim 9, further comprising storing the quantity of fast park cycles processed by the hard disk drive in a memory of the hard disk drive.

11. The method of claim 9, further comprising issuing a normal park command for the hard disk drive if the quantity of fast park cycles processed for the hard disk drive has reached a predetermined threshold.

12. The method of claim 9, further comprising issuing an alert indicating that the quantity of fast park cycles processed by the hard disk drive is approaching a predetermined threshold.

13. The method of claim 9, further comprising issuing an alert indicating that the quantity of fast park cycles processed by the hard disk drive has reached a predetermined threshold.

14. The method of claim 9, further comprising issuing an alert indicating that the quantity of fast park cycles processed by the hard disk drive has exceeded a predetermined threshold.

15. A hard disk drive protection system, comprising:
   a hard disk drive; and
   a protection module configured to determine whether to issue a fast park command for the hard disk drive based in part on a quantity of fast park cycles processed by the hard disk drive.

16. The system of claim 15, wherein the quantity of fast park cycles processed by the hard disk drive is stored in a memory of the hard disk drive.

17. The system of claim 16, wherein the protection module configured to compare the quantity of fast park cycles processed by the hard disk drive to a predetermined threshold to determine whether to issue the fast park command.

18. The system of claim 16, wherein the protection module is configured to issue an alert indicating the quantity of fast park cycles processed by the hard disk drive.

19. The system of claim 16, wherein the protection module is configured to issue an alert indicating that the quantity of fast park cycles processed by the hard disk drive has exceeded a predetermined threshold.

* * * * *

UNITED STATES PATENT AND TRADEMARK OFFICE
CERTIFICATE OF CORRECTION

PATENT NO. : 7,944,642 B2 Page 1 of 1
APPLICATION NO. : 12/319327
DATED : May 17, 2011
INVENTOR(S) : Jeffrey Kevin Jeansonne et al.

It is certified that error appears in the above-identified patent and that said Letters Patent is hereby corrected as shown below:

On the cover page, item (63), Related U. S. Application Data, in column 1, line 3, delete "11/413,571," and insert -- 11/413,574, --, therefor.

In column 1, line 12, delete "11/413,571" and insert -- 11/413,574 --, therefor.

Signed and Sealed this
Thirteenth Day of November, 2012

David J. Kappos
*Director of the United States Patent and Trademark Office*